(12) United States Patent
Colombi et al.

(10) Patent No.: US 12,119,704 B2
(45) Date of Patent: Oct. 15, 2024

(54) UNINTERRUPTIBLE POWER SUPPLY DEVICE

(71) Applicant: ABB Schweiz AG, Baden (CH)

(72) Inventors: Silvio Colombi, Losone (CH); Mario Schweizer, Rütihof (CH)

(73) Assignee: ABB Schweiz AG, Baden (CH)

( * ) Notice: Subject to any disclaimer, the term of this patent is extended or adjusted under 35 U.S.C. 154(b) by 50 days.

(21) Appl. No.: 17/991,254

(22) Filed: Nov. 21, 2022

(65) Prior Publication Data
US 2023/0163623 A1 May 25, 2023

(30) Foreign Application Priority Data

Nov. 22, 2021 (EP) .................................... 21209565

(51) Int. Cl.
*H02J 9/06* (2006.01)
*H02J 3/32* (2006.01)
*H02J 7/02* (2016.01)

(52) U.S. Cl.
CPC ............... *H02J 9/061* (2013.01); *H02J 3/32* (2013.01); *H02J 7/02* (2013.01); *H02J 2207/20* (2020.01)

(58) Field of Classification Search
CPC ...... H02J 7/02; H02J 9/061; H02J 3/32; H02J 2207/20
USPC .................................................... 307/66, 64
See application file for complete search history.

(56) References Cited

U.S. PATENT DOCUMENTS

| | | | | |
|---|---|---|---|---|
| 2009/0003020 A1* | 1/2009 | Zhang | ..................... | H02M 1/32 363/65 |
| 2014/0368043 A1* | 12/2014 | Colombi | ............... | H02J 3/1864 307/66 |
| 2019/0067986 A1 | 2/2019 | Haj-Maharsi et al. | | |
| 2019/0131888 A1* | 5/2019 | Zhong | ..................... | H02M 1/08 |
| 2019/0280492 A1 | 9/2019 | Haj-Maharsi et al. | | |

FOREIGN PATENT DOCUMENTS

| | | |
|---|---|---|
| EP | 3591798 A1 | 1/2020 |
| WO | 2020/236826 A1 | 11/2020 |

OTHER PUBLICATIONS

European Patent Office, Extended European Search Report in European Patent Application No. 21209565.7, 9 pp. (May 16, 2022).

* cited by examiner

*Primary Examiner* — Michael R. Fin
(74) *Attorney, Agent, or Firm* — Leydig, Voit & Mayer, Ltd.

(57) ABSTRACT

An uninterruptible power supply device includes a rectifier module coupled to an electrical power grid, an inverter module coupled to the rectifier module, and a battery converter module. The rectifier module can process a higher amount of electric power as the designed electrical power provided by the inverter module to enable the uninterruptible power supply device to provide stabilization support to the electrical power grid, wherein the rectifier module comprises at least two rectifier submodules, each dimensioned to process an amount of electrical power according to a capability of the inverter module to process power. The rectifier module is configured to electrically couple the rectifier submodules selectable to process a higher amount of electric power as the inverter module to provide stabilization support to the electrical power grid.

11 Claims, 2 Drawing Sheets

UNINTERRUPTIBLE POWER SUPPLY DEVICE

CROSS-REFERENCE TO RELATED APPLICATIONS

This patent application claims priority to European Patent Application No. 21209565.7, filed on Nov. 22, 2021, which is incorporated herein in its entirety by reference.

FIELD OF THE DISCLOSURE

The present disclosure relates to an asymmetrically configured uninterruptible power supply system providing grid support functionality.

BACKGROUND OF THE INVENTION

One important consideration in power production is keeping the grid stable, i.e. provide a stable voltage and frequency output. With the increase of renewable energy, utility companies are becoming more environmentally friendly, but also more susceptible to sudden variations in power generation or consumption which results in frequency variations. A uninterruptible power supply system (UPS) can have an important potential in stabilizing the grid frequency.

BRIEF SUMMARY OF THE INVENTION

A traditional UPS Device just consumes power and does not need to comply with grid codes. However, high power UPS systems have an important potential in stabilizing the grid if they include a four quadrants rectifier. Conventional frequency regulation for normal operation products are less attractive because of high storage capacity requirement.

Different systems are used to provide grid support in order to help the power grid maintain the nominal frequency. In particular, static converters can be used with the advantage of a very fast dynamic capability.

A first solution using a static converter is a Battery Energy Storage System (BESS). This is basically a battery coupled to an inverter connected to the grid with different controls allowing the exchange of active (P), reactive (Q) and harmonic power (H). A BESS allows different functionalities to be realized in addition to grid support, e.g. reactive power compensation, peak shaving, harmonic active filtering, etc. From an economic perspective, it is important for a BESS to realize multiple functionalities at the same time. In fact, if a BESS is used for grid support only the time required to depreciate the investment may be a challenge.

A second solution using static converters is an uninterruptible power supply (UPS). A traditional double conversion UPS is generally composed of a rectifier (R), an inverter (I), a battery converter (BC) and a bypass (Byp). A battery is generally connected to the battery converter. Typically, there are three operation modes: double conversion, bypass and battery discharge.

The normal operation mode is double conversion, where the grid is available, the battery is charged and the load is fed through the double conversion path formed by rectifier and inverter.

If the grid is not available, the load is fed from the inverter that is taking power from the battery through the battery converter. Finally, in case of some internal failures when in double conversion mode, the load is fed through the bypass. Normally, the rectifier is controlled in current to draw sinusoidal currents from the grid at unity power factor while the inverter is controlled in voltage to generate a clean sinusoidal voltage to supply the load.

A traditional UPS just consumes power and does not need to comply with grid codes. However, high power UPS systems have an important potential in stabilizing the grid if they include a four quadrants rectifier.

Aspects of the present invention are related to an uninterruptible power supply device and a use of the uninterruptible power supply device as described in the independent claims. Advantageous modifications of the invention are stated in the dependent claims. All combinations of at least two of the features disclosed in the description, the claims, and the figures fall within the scope of the invention. In order to avoid repetition, features disclosed in accordance with the method shall also apply and be claimable in accordance with mentioned systems.

BRIEF DESCRIPTION OF THE SEVERAL VIEWS OF THE DRAWING(S)

DETAILED DESCRIPTION OF THE INVENTION

Figure 1:
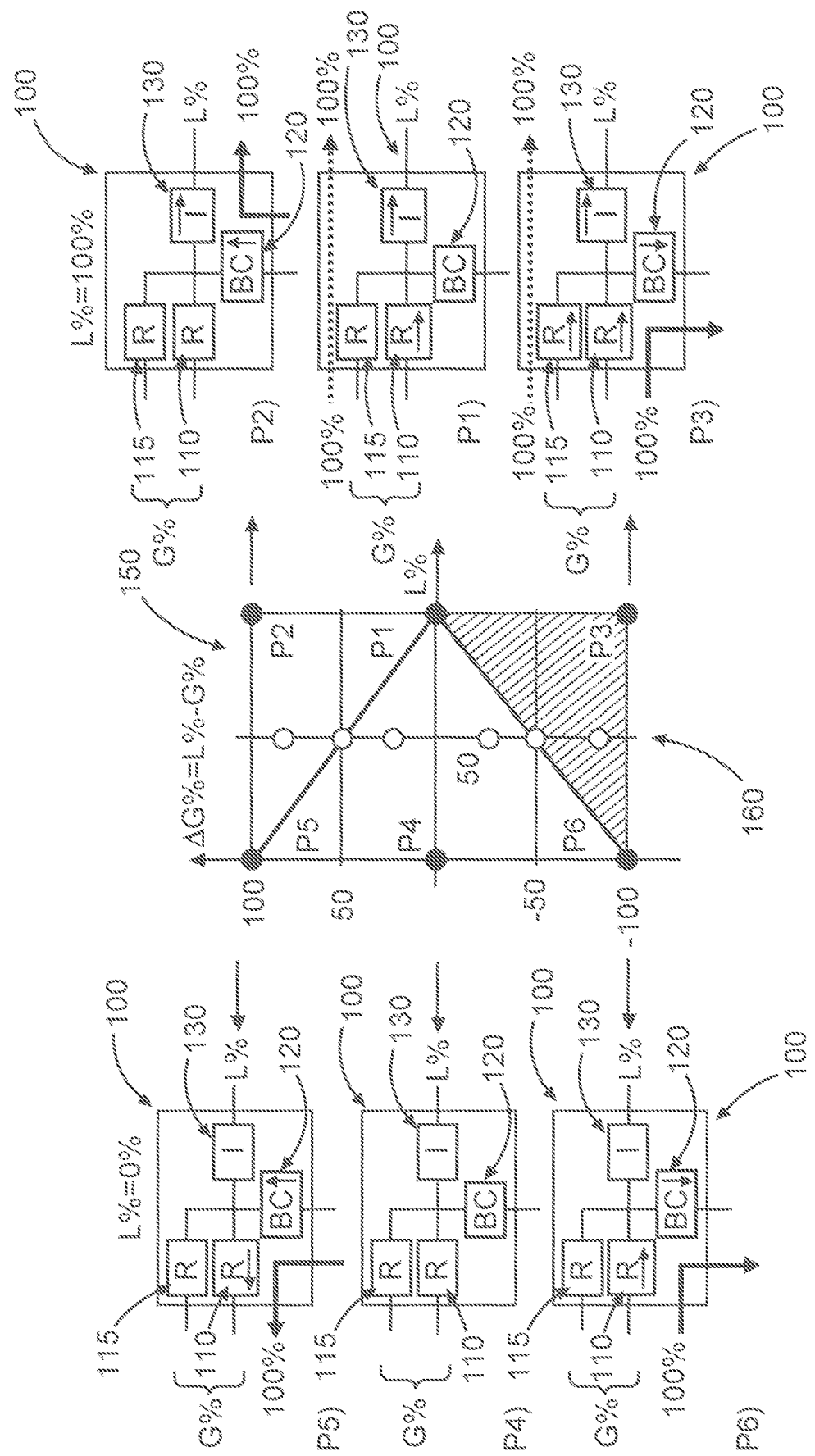
FIG. 1 is a block diagram illustrating different modes of operation of an uninterruptible power supply device electrically coupled to an operating electrical power grid in accordance with the disclosure.

FIG. 1 sketches schematically different modes of operation P1 to P6 of the uninterruptible power supply device to provide power to the electrical load coupled to the uninterruptible power supply device, with operating electrical power grid, which is electrically coupled to supply electrical power to the uninterruptible power supply device.

L % indicates a percentage of a designed electrical power provided by the inverter module to the electrical load. G % indicates a percentage of electrical power received by a rectifier module and/or rectifier submodule from the power grid.

L % is always positive, while G % can be positive, if the rectifier module receives electrical power from the power grid, e.g. operating point P1 of FIG. 1, or negative, if the rectifier module and/or rectifier submodule provides electrical power into the grid, e.g. operating point P5 of FIG. 1.

Throughout the specification, electrical losses of converters of the rectifier module and/or the inverter module and/or the battery converter module are not considered. The same is true for overload operation as these are transient conditions.

Diagram 150 maps regions within the diagram, where the uninterruptible power supply device (UPS) can provide grid support as a function of the load.

A difference between the electrical power provided to the electrical load and the power received from the electrical power grid: $\Delta G \% = L \% - G \%$ can be defined as a capability $\Delta G \%$ of the UPS to support the electrical power grid as a function of the electrical load.

The upper part of the diagram 150 with positive capability $\Delta G \%$ of the UPS, where the power grid frequency is too low, i.e. in case of deficit in generation of electrical power by the power grid, the UPS can be configured to reduce its consumption of electrical power and by this reduce the power grid loading and/or to provide electrical power to the power grid.

The upper region of the diagram 150 of FIG. 1 with positive capability ΔG % of the UPS can be characterised by the operational points P2 and P5, at which a standard uninterruptible power supply can support the power grid up to the designed electrical power of the UPS.

At the operational point P2, the grid frequency is too low, that means the generation of electrical energy of the power is deficient and the electrical load is 100%.

In that case, the UPS can be controlled in such a way that the rectifier submodules 110, 115 and/or the rectifier module are/is inactive, and to provide 100% of the electrical load L % from a battery via the battery converter module BC.

At the operational point P5, the power grid frequency is too low, that means the generation of electrical energy of the power is deficient and the electrical load L % provided by the UPS is zero. In that case, the UPS can be controlled in such a way that only one of the rectifier submodules 110, 115 is active to provide 100% of the designed electrical power of the UPS to the grid.

The operational points P1 and P4 characterise regions of diagram 150 where the power grid frequency is normal and the capability ΔG % is 0.

At the operational point P1, as marked within the diagram 150 of FIG. 1, describes an operation of the UPS were the power grid operates at its nominal frequency and where the electrical load of the UPS is 100%. In that case, the UPS can be controlled in such a way that only one of the rectifier submodules 110, 115 is active.

At the operational point P4, the power grid frequency is nominal and the electrical load L % provided by the UPS is zero. Thus, the UPS is not active.

On the other hand, in the lower part of the diagram 150, with negative capability ΔG % of the UPS, where the power grid frequency is too high, i.e. in case of surplus of generation of the power grid, the UPS needs to increase its consumption, hence to increase the grid loading.

The not hatched region within the lower part of diagram 150 characterises an operation region of the UPS, which can be supported by a standard uninterruptible power supply but only up to a difference between an actual electrical load of the standard uninterruptible power supply and the designed electrical power of the uninterruptible power supply.

For example, if the electrical load L % is 50% a standard uninterruptible power supply can support the electrical power grid by receiving additional power up to maximum 50% of the designed electrical power of the uninterruptible power supply. If the load is 100%, no additional power can be absorbed, because that would result in and overloading of a rectifier module of the standard uninterruptible power supply.

At the operational point P6, the power grid frequency is too high, that means the generation of electrical energy of the power grid is higher as demanded and the electrical load L % provided by the UPS is zero. In that case, the UPS can be controlled in such a way that only one of the rectifier submodules 110, 115 is active to provide up to 100% of the designed electrical power to the battery converter module, which can be electrically coupled to a battery to store the respective electrical energy.

If the rectifier module is configured to process electrical power, which is higher as the designed electrical power provided by the inverter module, as with the uninterruptible power supply device (UPS) described here, the power grid can be supported symmetrically. That means, that the UPS can be operated, in addition to a standard uninterruptible power supply as described above, in the complete hatched region of diagram 150 if the capability of the rectifier module is configured to process double the amount of electrical power as the designed electrical power, which is provided by the inverter module of the UPS. Particularly, the rectifier module can comprise two rectifier submodules, which are electrically coupled in parallel, to be configured to provide a higher amount of electrical power as the designed electrical power provided by the inverter module.

That means, at the operational point P3, were the power grid frequency is too high and the generation of electrical energy is higher as demanded. At the operational point P3, a demanded electrical power by the electrical load L % to be provided by the UPS is 100%. In that case the UPS can be controlled in such a way that both rectifier submodules 110, 115 are active, or the rectifier module is controlled to provide double of the designed electrical power of the UPS, to provide 100% of the designed electrical power to the electrical load L % and up to 100% of the designed electrical power to the battery converter module, which can be electrically coupled to a battery to store the respective electrical energy.

Figure 2:
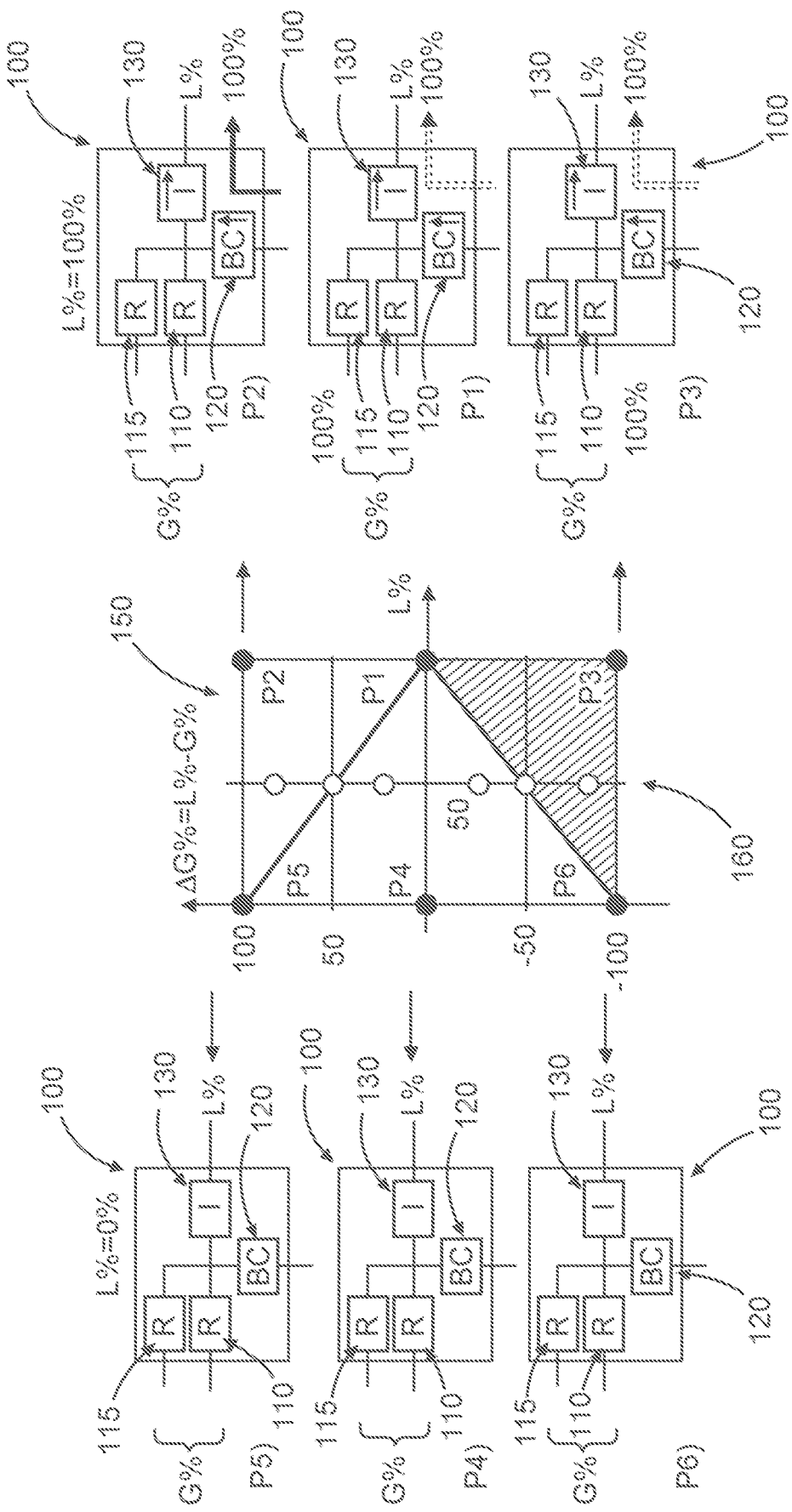
FIG. 2 is a block diagram illustrating different modes of operation of an uninterruptible power supply device with failing of the electrical power grid in accordance with the disclosure.

FIG. 2 sketches schematically different modes of operation of the uninterruptible power supply device to provide power to the electrical load coupled to the uninterruptible power supply device, with failing electrical power grid, which can be electrically coupled to supply electrical power to the uninterruptible power supply device if it is operating.

Because of the failing electrical power grid, the UPS can be configured to be idle at the operational points P4, P5 and P6.

At the operational points P1, P2, P3 the UPS can be configured to provide the electrical power demanded by the electrical load L % via the battery converter module BC, which configured to be coupled to a battery for supplying the electrical energy. At this operational points P1, P2, P3 the UPS can be configured to control the rectifier module and/or the rectifier submodules to be idle.

Line 160 within the diagram 150 of FIG. 1 or FIG. 2 connects operation points, where the electrical load of the UPS is 50% of the designed electrical power of the UPS.

In this entire description of the invention, the sequence of procedural steps is presented in such a way that the process is easily comprehensible. However, the skilled person will recognize that many of the process steps can also be executed in a different order and lead to the same or a corresponding result. In this sense, the sequence of the process steps can be changed accordingly. Some features are provided with counting words to improve readability or to make the assignment more clear, but this does not imply the presence of certain features.

The term "configured to" and equivalent can mean that something is implemented and/or realised and/or modified and/or build and/or adapted to provide a specific functionality.

To achieve these and other advantages and in accordance with the purpose of the invention, as embodied and broadly described herein, there is provided an uninterruptible power supply device configured to provide a designed electrical power to an electrical load, including a rectifier module, electrically coupled to an electrical power grid, and an inverter module, electrically coupled to the rectifier module and configured to provide the designed electrical power to the load, and a battery converter module, electrically coupled to the rectifier module and the inverter module; and configured to receive electrical power from the rectifier module and/or configured to provide electrical power to the inverter module.

The rectifier module is configured to receive electrical power from the electrical power grid, and to provide electrical power to the electrical power grid. Additionally the rectifier module is configured to be capable to process a higher amount of electric power as the designed electrical power provided by the inverter module to enable the uninterruptible power supply device to provide stabilization support to the electrical power grid.

An uninterruptible power supply device or uninterruptible power source can be an electrical apparatus that provides emergency power to an electrical load when the input power source or mains power fails. Preferably, an uninterruptible power supply can provide near-instantaneous protection from input power interruptions, by supplying energy stored in batteries, super capacitors, or flywheels. The on-battery run-time of most uninterruptible power sources is relatively short, e.g. only a few minutes, but this can be sufficient to start a standby power source or properly shut down the protected equipment. It is a type of continual power system.

An uninterruptible power supply can be used to protect hardware such as computers, data centres, telecommunication equipment, medical equipment or other electrical equipment where an unexpected power disruption could cause injuries, fatalities, serious business disruption or data loss. Uninterruptible power supply devices can range in size from devices designed to protect a single computer to large devices powering entire data centres or buildings.

The designed or nominal or specified electrical power of the uninterruptible power supply device can be determined by a capability of the inverter module, which is configured to provide the desired electrical power to the electrical load of the uninterruptible power supply (UPS).

The rectifier module and/or rectifier submodules can be configured to be controlled in respect to current to draw sinusoidal currents from the power grid at a unity power factor to reduce harmonic distortions.

The inverter module can be configured to be voltage source to generate a clean sinusoidal voltage to the electrical load.

The uninterruptible power supply device can provide a flexible and scalable solution to implement UPS functionalities and stabilisation support to the electrical power grid, such as, for example, enhanced frequency response (EFR) functionalities, as one factor promoting grid support functionality, within one device. That means, the uninterruptible power supply device is configured to provide two functionalities: grid support and/or UPS functionalities and is scalable for small and large UPS systems, comprising an uninterruptible power supply device and a battery electrically coupled to the battery converter module.

Advantageously, the described uninterruptible power supply device is configured to selectively expand the power of the rectifier converter in order to fully benefit from the national reward schemes according to a grid code of the power grid.

Particularly, the uninterruptible power supply device can be configured for a full symmetric grid support capability including a rectifier module needs which can be "oversized" in respect to the electrical power which can be processed as compared to the electrical power which can be processed by the inverter module. Such a rectifier module can, for instance include two rectifier submodules, which are coupled and configured to operate in parallel optionally on demand.

The grid code of the power grid details technical requirements for connecting to and using the National Electricity Transmission System (NETS).

The described uninterruptible power supply device can be configured to be controlled according to specific grid support algorithms and is optimised for full benefit in respect of the provision of stabilisation support to the electrical power grid, because with variable electrical load the uninterruptible power supply device has to be configured to provide 100% electrical load on demand. For such a situation the uninterruptible power supply device includes a rectifier module which is configured to process a higher amount of electrical power as the designed electrical power provided by the inverter module to provide an asymmetric and/or a symmetric stabilisation support for the electrical power grid, particularly by storing and/or providing electrical power from/to the electrical power grid from a battery which can be electrically coupled to the battery converter module.

The symmetric stabilisation support for the electrical power grid means, that electrical power can be provided, in case where the power grid frequency is too low, and received, respectively absorbed, in case where the power grid frequency is too high, from the electrical power grid even with 100% electrical load.

Advantageously, the uninterruptible power supply device provides a flexible and scalable solution to implement uninterruptible power supply (UPS) and e.g. enhanced Frequency response (EFR) functionalities. This can maximize a profitability of the grid support reward schemes. A rectifier module including two full power rectifier submodules allows full symmetric designed electrical power capability to be obtained even at maximal electrical load provided by the uninterruptible power supply device.

If the maximal electrical load is less than the designed electrical power, one of the rectifier submodule can be operated at a reduced electrical power, according to the electrical load of the uninterruptible power supply device.

The uninterruptible power supply can be configured for seamless transitions between a normal operational mode and a grid support operational mode, while typically providing low harmonic distortion of currents and voltages.

As an example, the uninterruptible power supply device can be configured to support frequency regulation for disturbance (FCR-D) and/or fast frequency regulation because of low electrical storage capacity required for a battery coupled to the uninterruptible power supply device. That means, that the battery, which can be electrically coupled to the UPS, does not need to be oversized. Therefore, a typical Data Center owner does not need to increase his investment in order to benefit from the revenues of grid support.

Advantageously, the uninterruptible power supply device can be used not only to protect the critical load, but at the same time, they can provide grid support generating revenue.

Using other words, the uninterruptible power supply device can be configured to selectively expand the electrical power of the rectifier module in order to fully benefit from the national reward schemes. If the rectifier module comprises and operates at least two full power rectifier submodules, like in operating point P3, as described below, the UPS has a capability to full symmetric support the electrical power grid even at maximal UPS load.

Converter losses, which are included in the rectifier module and/or inverter module and/or battery converter module are not considered here. The same is true for overload operation of the converters as these are transient conditions.

As an example, the uninterruptible power supply device can be used as fast reserve products as these are more suitable for UPS because they do not need the battery, which can be electrically coupled to the battery converter module, to be oversized. This can improve the economic interest of the solution. However, the uninterruptible power supply device as proposed is applicable also for energy intensive reserve products.

From a battery sizing perspective and because of the fast reserve products considered, the battery does not typically need to be oversized.

A typical support time of the uninterruptible power supply device to the load can be a short time as, e.g., 5 to 10 min.

Various aspects are discussed hereinafter. According to an aspect, the rectifier module is configured to receive, respectively absorb, electrical power from the electrical power grid and to provide electrical power to the electrical power grid, and the rectifier module is capable and/or configured to process a higher amount of electric power as the designed electrical power of the inverter module to enable the uninterruptible power supply device to provide symmetric stabilization support to the electrical power grid.

According to an aspect, the uninterruptible power supply device is configured to provide electrical power to the power grid; and wherein the inverter module is coupled to an output of the uninterruptible power supply device, preferably to provide the designed electrical power to the electrical load.

According to an aspect, the rectifier module is configured to process at least a double amount of electric power as the inverter module.

According to an aspect, the rectifier module is configured to expand a capability to process an amount of electrical power beyond a capability to process electrical power of the inverter module optionally on demand.

Alternatively or additionally, if the maximal electrical load of the uninterruptible power supply device is smaller than the designed electrical power of the UPS, then one of at least two rectifier submodules can be operated at a reduced electrical power, which can be equal to the electrical load of the UPS. Alternatively or additionally the uninterruptible power supply device can be configured to selectively expand additional power for the rectifier module, e.g. by providing 150% of the designed electrical power, operationally adapted to an actual electrical load. The uninterruptible power supply device can be configured to comprise at least two rectifier submodules to selectively expand additional power.

According to an aspect, the rectifier module comprises at least two rectifier submodules, wherein each of the submodules is dimensioned to process an amount of electrical power according to a capability of the inverter module to process power; and wherein the rectifier module is configured to electrically couple the submodules selectable to process a higher amount of electric power as the inverter module to provide stabilization support to the electrical power grid.

According to an aspect, the uninterruptible power supply device is modular configurable by using respective kinds of submodules to build the rectifier module and/or the inverter module and/or the battery converter module, and the uninterruptible power supply device is in respect to the number of submodules of one kind asymmetrical configured, such that a multitude of submodules of the rectifier modules, which are configured to be electrically coupled in parallel, is greater than a multitude of submodules of the inverter modules, which are configured to be electrical coupled in parallel.

The respective submodules can be configured to be activated on-the-fly depending on the real-time processed power, i.e., if a high electrical power is processed, the number of rectifier submodules electrically coupled in parallel and/or the number of inverter submodules electrically coupled in parallel is higher than the number of submodules, which are activated at low processed power. That means that a part of the available number of submodules of the rectifier module and/or inverter modules can be deactivated if the demand of processed power is low. This improves the efficiency of the uninterruptible power supply device.

Advantageously the modular configurable uninterruptible power supply device enables to expand selectively an electrical power capability of the respective modules.

According to an aspect, at least one of the rectifier submodules is configured to be activated or deactivated during full operation of the uninterruptible power supply device, to expand the capability of the rectifier module to process the amount of electrical power, preferably to provide the stabilization support to the electrical power grid.

In one embodiment, the uninterruptible power supply device is configured to adapt the capability to process a higher amount of electrical power or the lower amount of electrical power on-the-fly depending on a real-time demand.

That means that the respective submodule and/or the uninterruptible power supply device is configured to increase or decrease the power during full operation mode by including or decoupling of a submodule to avoid any transient disturbance for the power grid support and/or the electrical load.

On-the-fly operation or switching means that the operation or switching is done in full operation mode in real time.

Advantageously, to configure a module, particularly the rectifier module, to be capable to process a higher amount of electrical power by electrically coupling or decoupling of submodules increases the efficiency of the uninterruptible power supply, because running a uninterruptible power supply device or a module with small load in respect to its power capability can decrease its efficiency.

As an example if the uninterruptible power supply device is designed for an electrical power of 500 kW, then for instance, the rectifier module can comprise two rectifier submodules, each having a capability to process 500 kW, to have the capability to process a higher amount of electrical power as the designed electrical power of the inverter module.

According to an aspect, the submodules of the rectifier module are configured to operate with interleaved modulation for reduction of current distortions.

According to an aspect the rectifier submodules and/or the inverter submodules and/or the battery converter modules, which are configured to be electrically coupled in parallel, to increase or to decrease the capability to process electrical power, can be configured to operate in an interleaved modulation mode to further reduce current distortions and to adapt filtering requirements. This can result in reduced commutation losses.

According to an aspect, the rectifier module is configured to supply concurrently electrical power to the inverter module and the electrical power grid.

According to an aspect, the rectifier module is configured to operate electrical power in four-quadrants to provide electrical power to the electrical power grid.

To operate electrical power in four-I-U-quadrants can mean that the respective module and/or an inverter of the respective module is capable to receive and to supply electrical power to and from its input and/or output.

According to an aspect, the uninterruptible power supply device comprises a control unit, which is configured to control the uninterruptible power supply for receiving electrical power from the electrical power grid and/or for providing electrical power to the electrical power grid according to a grid code.

The Grid Code details the technical requirements for connecting to and using the National Electricity Transmission System (NETS).

According to an aspect, the uninterruptible power supply device is configured to measure a grid frequency, preferably by the control unit, to adapt the electrical power received from, or provided to, the electrical power grid, based on the measured grid frequency, to provide stabilization support to the electrical power grid.

According to an aspect, the UPS measures the grid frequency and adapts online the consumed power from the power grid based on the measured grid frequency to provide symmetric or asymmetric stabilization support, with only one module or reduced power ancillary services irrespective of the critical load level Advantageously, the uninterruptible power supply device (UPS) with symmetric or a symmetric stabilisation support can fulfil different requirements of different customers and/or countries.

According to an aspect, the control unit is configured to operate a battery electrically coupled to the battery converter module at a reduced state-of-charge to enable the uninterruptible power supply device to provide symmetric stabilization support to the electrical power grid.

As an example, the battery can be operated at reduced state-of-charge, for example, at 70% of its loading capacity, to provide symmetrical ancillary services.

The battery technology of the battery, which can be coupled to the uninterruptible power supply device, can be suitable for fast battery charging and discharging at the required power level and up to the designed power of the UPS. As an example, modern lithium-ion batteries can be used.

For a use of the uninterruptible power supply device in respect to a fast response reserve, the capacity of the battery does not need to be oversized. As an example, a typical critical power application uses a 6 min to 10 min autonomy, which allows isolated grid support periods of about 30 seconds to 60 seconds A set point for the battery can be chosen specific to the dedicated reserve product taking into account specific requirements for the battery management.

As an example, with a 10 min autonomy battery and a maximal grid support duration of 2 min, a typical nominal set point for the battery charge could be 80% at the beginning of the grid support availability window. This way, during the grid support availability window it is possible to both increase or decrease the power consumption of the UPS. Right after the grid support availability window, the set point for the battery charge can be positioned again at 80%.

According to an aspect the uninterruptible power supply device is configured to adapt during full operation the electrical power received from the grid based on a reference power command received from a communication means to provide stabilization support to the electrical power grid.

Using other words, the uninterruptible power supply device can be operated to adapt the stabilisation support depending on the measured frequency and/or to adapt the stabilisation support depending on a command provided according to a specific protocol. The uninterruptible power supply device can be configured to operate providing symmetric or asymmetric ancillary services irrespective of the actual load level.

According to an aspect the uninterruptible power supply device comprises a bypass circuitry, which is configured to provide an electrical coupling of input of the rectifier module with an output of the inverter module optionally on demand; and wherein the uninterruptible power supply device is configured to receive electrical power from the electrical power grid and/or for providing electrical power to the electrical power grid according to a grid code.

Advantageously, the uninterruptible power supply device, comprising a bypass circuit, can be configured to provide ancillary services, when the bypass is activated A use of the uninterruptible power supply device as described above is proposed for providing stabilization support to an electrical power grid.

The number of activated parallel rectifier modules can be different compared to the number of activated parallel inverter modules because the power processed by the rectifier can be different compared to the power processed by the inverter if ancillary services are provided with the UPS All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An uninterruptible power supply device (UPS) configured to provide a designed electrical power to an electrical load, comprising:
   a rectifier module electrically coupled to an electrical power grid;
   an inverter module electrically coupled to the rectifier module and configured to provide the designed electrical power to the load;
   a battery converter module electrically coupled to the rectifier module and the inverter module, the battery converter module being configured to receive electrical power from the rectifier module and to provide electrical power to the inverter module;
   a control unit configured to detect a measured grid frequency of the electrical power grid;
   wherein the rectifier module is configured to receive electrical power from the electrical power grid; and to provide electrical power to the electrical power grid; and
   wherein the rectifier module is arranged to process a higher amount of electric power as the designed electrical power provided by the inverter module to enable the uninterruptible power supply device to provide stabilization support to the electrical power grid;
   wherein the rectifier module comprises at least two rectifier submodules, each of the at least two rectifier submodules being dimensioned to process an amount of electrical power according to a capability of the inverter module to process power; and
   electrically coupling by the rectifier module, in response to the amount of electrical power exceeding the capability of the inverter module and the control unit detecting a frequency of the electrical power grid being outside a nominal frequency for the electrical power grid, the rectifier submodules selectably to process a higher amount of electric power as the inverter module to provide stabilization support to the electrical power grid by activating or deactivating at least one of the at least two rectifier submodules during full operation of the uninterruptible power supply device to expand the capability of the rectifier module to process the amount of electrical power.

2. The uninterruptible power supply device according to claim 1, wherein the rectifier module is configured to process at least a double amount of electric power as the inverter module.

3. The uninterruptible power supply device according to claim 1, wherein the rectifier module is configured to expand the capability to process the amount of electrical power beyond the capability to process electrical power of the inverter module.

4. The uninterruptible power supply device according to claim 1, wherein the at least two rectifier submodules of the rectifier module are configured to operate with interleaved modulation for reduction of current distortions.

5. The uninterruptible power supply device according to claim 1, wherein the rectifier module is configured to supply electrical power to the inverter module and to the electrical power grid concurrently.

6. The uninterruptible power supply device according to claim 1, wherein the rectifier module is configured to operate electrical power in four-quadrants to provide electrical power to the electrical power grid.

7. The uninterruptible power supply device according to claim 1, further comprising receiving electrical power from the electrical power grid and/or for providing electrical power to the electrical power grid according to a grid code.

8. The uninterruptible power supply device according to claim 7, further comprising measuring a grid frequency to adapt the electrical power received from, or provided to, the electrical power grid, based on the measured grid frequency, to provide stabilization support to the electrical power grid.

9. The uninterruptible power supply device according to claim 7, further comprising a battery electrically coupled to the battery converter module at a reduced state-of-charge to enable the uninterruptible power supply device to provide symmetric stabilization support to the electrical power grid.

10. The uninterruptible power supply device according to claim 7, further comprising adapting during full operation the electrical power received from the grid based on a reference power command received from a communication means to provide stabilization support to the electrical power grid.

11. The uninterruptible power supply device according to claim 1, further comprising:
   a bypass circuitry configured to provide an electrical coupling of input of the rectifier module with an output of the inverter module;
   wherein the uninterruptible power supply device is configured to receive electrical power from the electrical power grid and provide electrical power to the electrical power grid according to a grid code.

* * * * *